United States Patent [19]

Haverkamp

[11] 4,162,147
[45] Jul. 24, 1979

[54] APPARATUS FOR TREATING EFFLUENTS

[75] Inventor: Wilhelm Haverkamp, Essen, Fed. Rep. of Germany

[73] Assignee: Krupp-Koppers GmbH, Essen, Fed. Rep. of Germany

[21] Appl. No.: 912,522

[22] Filed: Jun. 5, 1978

[30] Foreign Application Priority Data

Jun. 10, 1977 [DE] Fed. Rep. of Germany ....... 2726233

[51] Int. Cl.² .............................................. B01D 19/00
[52] U.S. Cl. ........................................ 55/191; 55/196;
55/204; 55/205; 210/188; 210/220; 210/262;
210/512 R; 261/123; 261/124
[58] Field of Search ............ 55/53, 191, 196, 203–205;
210/188, 220, 221, 261, 262, 304, 512 R;
261/123, 124

[56] References Cited

U.S. PATENT DOCUMENTS

| 3,282,030 | 11/1966 | Griffo et al. | 55/205 X |
| 3,318,073 | 5/1967 | Adkins | 55/204 X |
| 3,414,248 | 12/1968 | Iwanaga et al. | 261/123 X |
| 4,120,673 | 10/1978 | Nieden | 210/512 R X |

FOREIGN PATENT DOCUMENTS 77098 11/1917 Switzerland .............................. 261/123

Primary Examiner—Charles N. Hart
Assistant Examiner—Richard W. Burks
Attorney, Agent, or Firm—Michael J. Striker

[57] ABSTRACT

An apparatus for removing harmful substances from effluents has two chambers located symmetrically at opposite sides of an effluent channel. Each chamber contains two or more stacked trays which are each provided with a spiral flow path descending from a tray inlet to a tray outlet. All tray inlets are so located in the channel that substantially all effluent flowing in the channel is compelled to enter them and to travel by gravity through the respective tray. Air, an insert gas or a mixture of both is bubbled from below through the effluent flowing in the trays to expel and entrain the harmful substances. The treated effluent is then discharged back into the channel at locations downstream of its point of admission into the inlets.

10 Claims, 3 Drawing Figures

APPARATUS FOR TREATING EFFLUENTS

BACKGROUND OF THE INVENTION

The present invention relates to the removal of harmful substances from effluents, particularly industrial effluents.

More particularly, the invention relates to an apparatus for effecting such removal.

Some effluents contain harmful substances which must be removed to avoid ecological damage, such as ground-water contamination. This is particularly true with respect to residual traces of $H_2S$, HCN and $NH_3$ which are found in certain industrial effluents. Equipment previously proposed for this purpose is not satisfactory for a variety of reasons.

SUMMARY OF THE INVENTION

Accordingly, it is an object of the invention to provide an improved apparatus for the removal of harmful substances from effluents.

Another object is to provide such an apparatus which is of relatively simple construction, so that it is comparatively inexpensive to produce and is reliable in its operation.

Still a further object is to provide an apparatus of the type in question, which has a relatively low energy consumption.

In keeping with these objects, and with others which will become apparent hereafter, one feature of the invention resides in an apparatus for removing harmful substances from effluents which flow through an effluent channel. Briefly stated, the apparatus may comprise wall means forming at one side of the effluent channel a treating chamber having an upper gas outlet opening, at least two superposed trays in the treating chamber and each having an upper inlet and a lower outlet connected by a spiral flow path, the inlets being located in the effluent channel so that effluent flowing in the channel is compelled to enter into them, the trays having respective bottom walls provided with nozzles and respective top walls provided with concentric gas outlets which communicate with the interior of the treating chamber, and means for supplying treating gas to the nozzles so that the gas issues from the nozzles and travels through the effluent in the respective tray to entrain harmful substances present in the effluent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
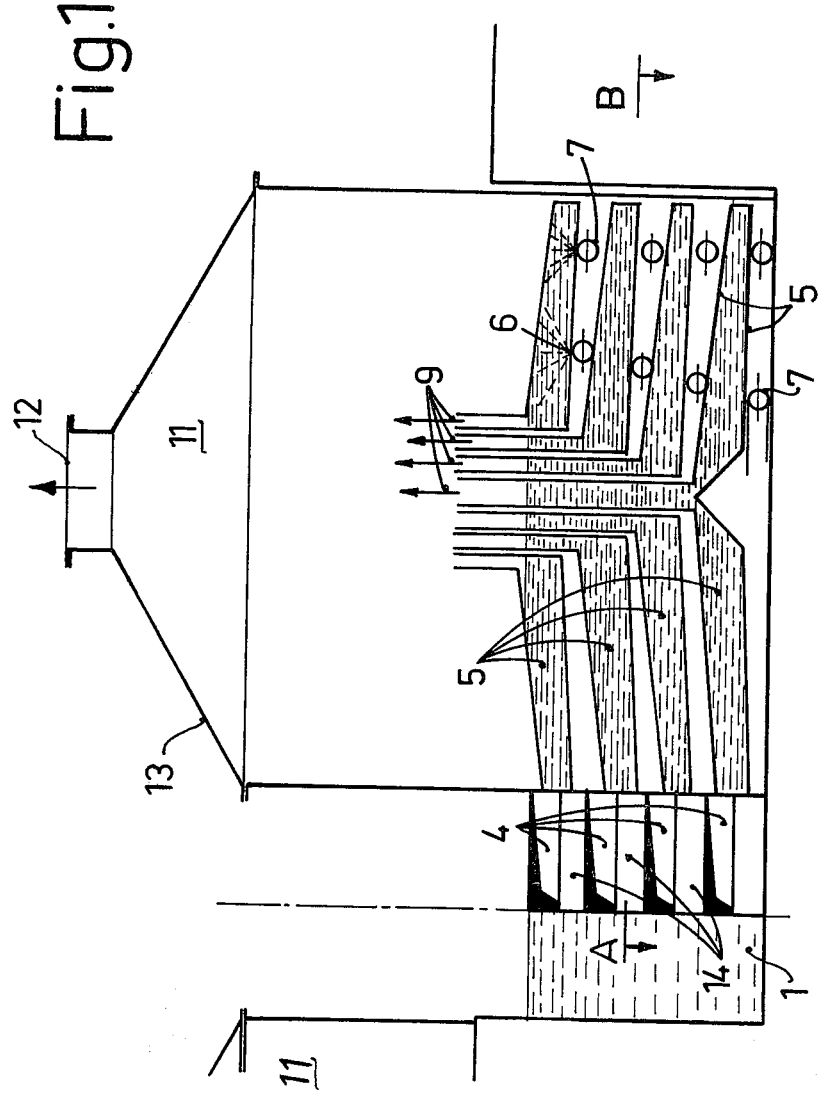
FIG. 1 is a somewhat diagrammatic vertical section through the right-hand side of an apparatus according to the invention.

It should be understood, when considering the drawing, that the apparatus illustrated in FIG. 1 is mirror-symmetrical in that the effluent channel 1 is flanked at both sides with identical treating chambers 11, of which however, only the right-hand one is shown. A description of the right-hand chamber 11 will therefore suffice, since it is also applicable to the identical left-hand chamber 11 (partly visible in FIG. 1). The vertical chain line intersecting the effluent channel 1 represents the axis of symmetry of the apparatus.

The chamber 11 is normally of the illustrated tower-shaped configuration; however, a different shape is also possible. At its top it has an upwardly convergent cover 13 which is provided with a gas outlet 12. It is advantageous to make the cover removable in order to facilitate access to the interior of the chamber 11.

In this interior is arranged a column of vertically superposed gas-liquid contact trays 5 (one shown in detail in FIG. 3) through which the effluent to be treated is compelled to flow. The number of such trays 5 in the column depends upon the liquid (effluent) level which is normally maintained in the channel 1 and is accommodated to this level.

Figure 2:
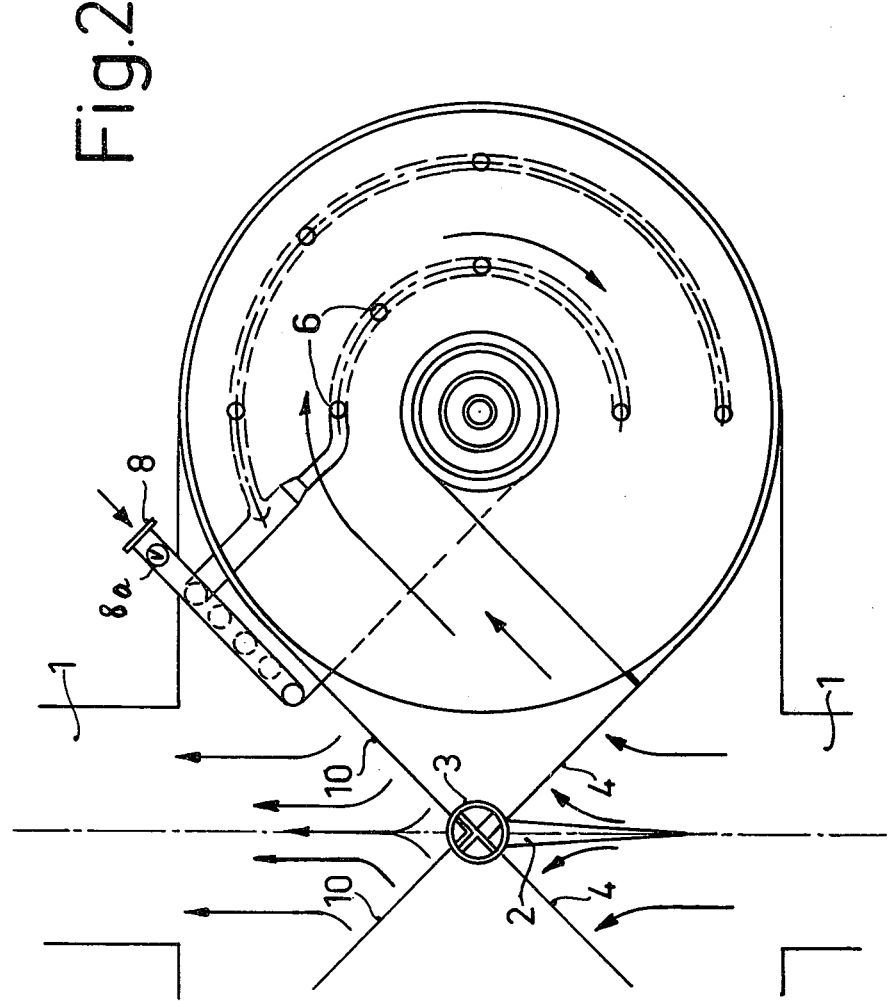
FIG. 2 is a diagrammatic, horizontal section through FIG. 1, taken on line A–B thereof.
Figure 3:
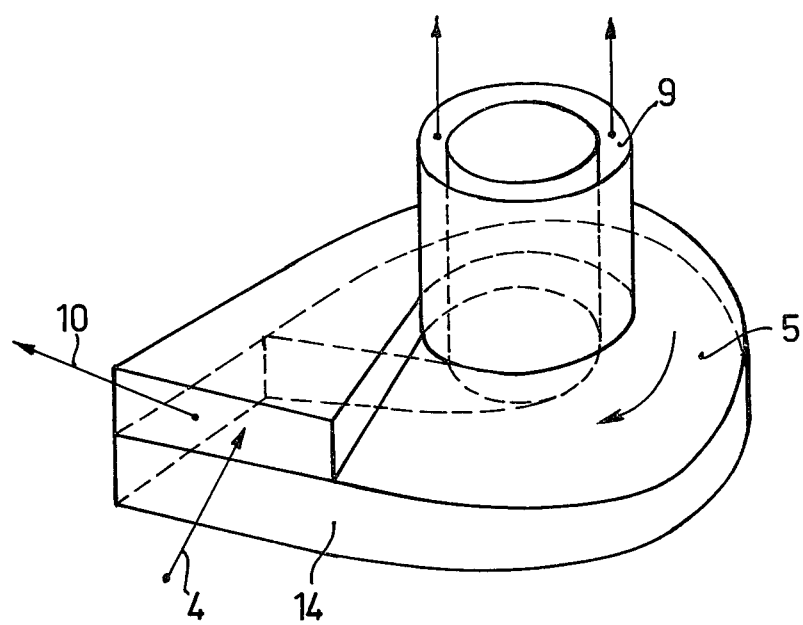
FIG. 3 is a perspective view, illustrating a component of the apparatus in FIGS. 1 and 2.

As shown more clearly in FIG. 3, the trays 5 are completely closed structures having at their bottom sides the gas-admitting nozzles 6 (FIGS. 1 and 2) and at their top sides the concentric gas outlet openings 9 (FIGS. 1 and 3). According to the invention either air or inert gas (or a mixture of both) is supplied to the nozzles 6 via conduits 7. The gas issuing from the nozzles 6 becomes finely distributed (in form of bubbles) throughout the effluent in the trays 5 which is admitted into the trays via inlets 4 and leaves them via outlets 10 (FIG. 3), and passes through this effluent in upward direction.

In its travel through the effluent the gas expells and entrains the harmful substances and passes through the concentric outlet openings (see the arrows in FIG. 1) into the free space of the chamber 11 above the tray column, from where it is vented (e.g. by means of a not illustrated exhaustor) through the outlet 12. The gas may, thereafter, be subjected to a post-treatment to remove the entrained substances from it, should this be found necessary.

The arrows in FIG. 2 illustrate the flow of the effluent through one of the trays 5 which is representative of all others. Since the trays 5 are shaped to provide the effluent with a spiral flow path which descends from inlet 4 to outlet 10 (FIGS. 2 and 3), the effluent flow will automatically (i.e. by gravity) take place in the desired direction.

The portions of the trays 5 in which the inlet openings 4 are provided, extend into the effluent channel 1 (FIG. 2) so that the effluent flowing through the channel is compelled fully (i.e. in its entirety) to enter the respective inlet openings 4 and pass through the trays 5. The distribution of the incoming effluent in channel 1 to the individual inlets 4 can be controlled, e.g. by means of the gate-type diverter flap 2 (FIG. 2) which may be moved (i.e. in FIG. 2 pivoted about an axis normal to the plane of the drawing) by a handwheel 3 which is coupled with it. Of course, the flap 2 could also be moved by a servomotor, if desired, which might be program-controlled in dependence upon known parameters, e.g., periodic fluctuations in the effluent flow.

However, details of this do not form part of the invention.

When the flap 2 is in the position shown in FIG. 2, the effluent is distributed uniformly into the inlets 4 leading to the two chambers 11 which are located at opposite sides of the channel 1. Evidently, the flow of effluent to one chamber may be decreased and the flow to the other chamber may be increased, by suitably repositioning the flap 2 which, incidentally, may be so dimensioned that in its end positions it is capable of overlying and completely blocking all inlets 4 of one or the other of the chambers 11. Once the effluent has been treated, it is readmitted from the outlets 10 into the channel 1 downstream of the flap 1, for reuse or discharge.

The supply of air and/or inert gas (e.g. nitrogen) to the conduits 7 is effected via a supply conduit 8 (FIG. 2). The conduits 7 are mounted below the bottom walls of the respective trays 5, in circular or semi-circular configuration. The number of nozzles 6 and conduits 7 per tray may be selected at will and can be adapted to the particular requirements, e.g. to the required intensity of the gas-liquid contact. In addition, suitable valves (known per se) may be installed in the conduits 7 and/or 8 (see e.g. 8a in FIG. 2) to permit the gas flow to the trays 5 to be varied. The gas flow may be so regulated that some of the trays receive more gas per unit time than others.

As mentioned before the flow path for effluent, which is defined in the trays 5, is of spiral configuration intermediate the inlet 4 and the outlet 10. FIG. 3 shows that the drop (i.e. the distance from the lower edge of inlet 4 to the lower edge of outlet 10) corresponds to the height of the circumferential sidewall 14 of the respective tray. The side wall 14 also separates the inlets 4 of two immediately superposed trays 5 (FIG. 1). The outlet 9 of the tray 5 shown in FIG. 3 is annular; the diameter of the outlet 9 depends, for each tray 5, on the vertical position of the tray with respect to the overall height of the tray column. FIG. 1 shows that only the outlet 9 of the lowermost tray 5 of the column is of tubular shape, whereas all those of the other trays are annular and concentric, with the outlet diameter increasing in upward direction from tray to tray until the uppermost tray is reached where the outlet 9 has the largest diameter (FIG. 1).

The chambers 11 and trays 5 may be made of a variety of materials, including such metals as steel or aluminum. Particularly advantageous, from a point of view of cost and life expectancy, is reinforced concrete. The trays 5 could, however, also be made of a suitable synthetic plastic material, i.e. a material which is not affected by the harmful substances in the effluent. The determination of a suitable material can be readily made once it is known what particular harmful substances are present in the effluent.

The invention meets the requirements made of it, in that the apparatus is simple in construction and can therefore be constructed at comparatively low cost. Moreover, the apparatus requires no energy for its operation, since the flow of the effluent through the trays from the inlets 4 to the outlets 10 is a function of gravity. The flow speed of the effluent may be influenced by the tray diameter, in dependence upon the quantity of effluent which enters the respective inlet per unit time.

The apparatus is evidently not limited to the treatment of effluents containing a particular type of harmful substance. However, it has been found to be especially advantageous for the treatment of industrial effluents containing residual quantities of $H_2S$, HCN and/or $NH_3$, whether or not these effluents have been subjected to a pretreatment before reaching the apparatus.

A specific case in point, for which the inventive apparatus is well suited, is the treatment of effluents derived from scrubbing installations for partial oxidation gases.

While the invention has been illustrated and described as embodied in an effluent treating apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An apparatus for removing harmful substances from effluents which flow through an effluent channel, comprising wall means forming at one side of the effluent channel a treating chamber having an upper gas outlet opening; at least two superposed trays in said treating chamber and each having an upper inlet and a lower outlet connected by a spiral flow path, said inlets being located in the effluent channel so that effluent flowing in the channel is compelled to enter into them, said trays having respective bottom walls provided with nozzles and respective top walls provided with concentric gas outlets which communicate with the interior of said treating chamber; and means for supplying treating gas to said nozzles so that the gas issues from said nozzles and travels through the effluent in the respective tray to entrain harmful substances present in the effluent.

2. An apparatus as defined in claim 1; further comprising additional wall means forming at an opposite side of the effluent channel another treating chamber which is arranged symmetrically relative to the first-mentioned chamber, at least two additional trays in said other treating chamber similar to the first-mentioned trays, and additional means for supplying treating gas to the nozzles of said additional trays, the inlets of all of said trays being so located in said effluent channel that substantially the entire amount of effluent flowing in the channel is compelled to enter the respective inlets for treatment in the respective chambers.

3. An apparatus as defined in claim 2; and further comprising means for divering effluent from the channel preferentially into one or the other of said chambers.

4. An apparatus as defined in claim 3, said diverting means comprising a diverter flap mounted at the center of said channel intermediate said chambers.

5. An apparatus as defined in claim 2, said wall means comprising for each of said chambers an upright circumferential wall, and a removable cover atop the respective circumferential wall.

6. An apparatus as defined in claim 2, said supplying means comprising a main supply conduit and a plurality of secondary supply conduits associated with the respective trays and communicating with said main supply conduit.

7. An apparatus as defined in claim 6; and further comprising valve means in at least some of said conduits for regulating the flow of gas therethrough.

8. An apparatus as defined in claim 1, wherein said gas is air.

9. An apparatus as defined in claim 1, wherein said gas is an inert gas.

10. An apparatus as defined in claim 1, wherein said gas is a mixture of air and inert gas.

* * * * *